A. M. PHILLIPS.
AIR-CHAMBER FOR LIQUID SPRAYING DEVICES.
APPLICATION FILED JULY 31, 1907.

931,215.

Patented Aug. 17, 1909.

Witnesses
Frank Hough
Wm Bagger

Inventor
Adelbert M Phillips,
By Victor J. Evans
Attorney

UNITED STATES PATENT OFFICE.

ADELBERT M. PHILLIPS, OF LE ROY, NEW YORK.

AIR-CHAMBER FOR LIQUID-SPRAYING DEVICES.

No. 931,215.     Specification of Letters Patent.     Patented Aug. 17, 1909.

Application filed July 31, 1907. Serial No. 386,443.

*To all whom it may concern:*

Be it known that I, ADELBERT M. PHILLIPS, a citizen of the United States, residing at Le Roy, in the county of Genesee and State of New York, have invented new and useful Improvements in Air-Chambers for Liquid-Spraying Devices, of which the following is a specification.

This invention relates to air chambers for liquid spraying devices of that class which includes a pump for forcing liquid from a tank or receptacle through a spraying nozzle; the air chamber being utilized for the purpose of insuring a constant and steady flow of the liquid through the discharge nozzle, instead of an intermittent discharge such as would ordinarily be caused by the pulsations of the pump.

Spraying devices of this class are largely used for the purpose of supplying medicated and poisonous liquids to fruit trees, vines and other plants in order to promote growth and for the destruction of pests, and the liquid employed frequently contains a large proportion of insoluble substances which unless constant agitation is kept up are apt to interfere with the operation of the device.

The object of the present invention is to overcome this objection, and to provide straining means whereby the sediment is excluded from the spraying nozzles, and thus prevented from interfering with the operation.

With these and other ends in view as will appear as the nature of the invention is better understood, the same consists in the improved construction and novel arrangement and combination of parts which will hereinafter be fully described and particularly pointed out in the claim.

In the accompanying drawing has been illustrated a simple and preferred form of the invention; it being, however, understood that no limitation is necessarily made to the precise structural details therein exhibited, but that changes, alterations and modifications within the scope of the claim may be resorted to when desired.

Figure 1:
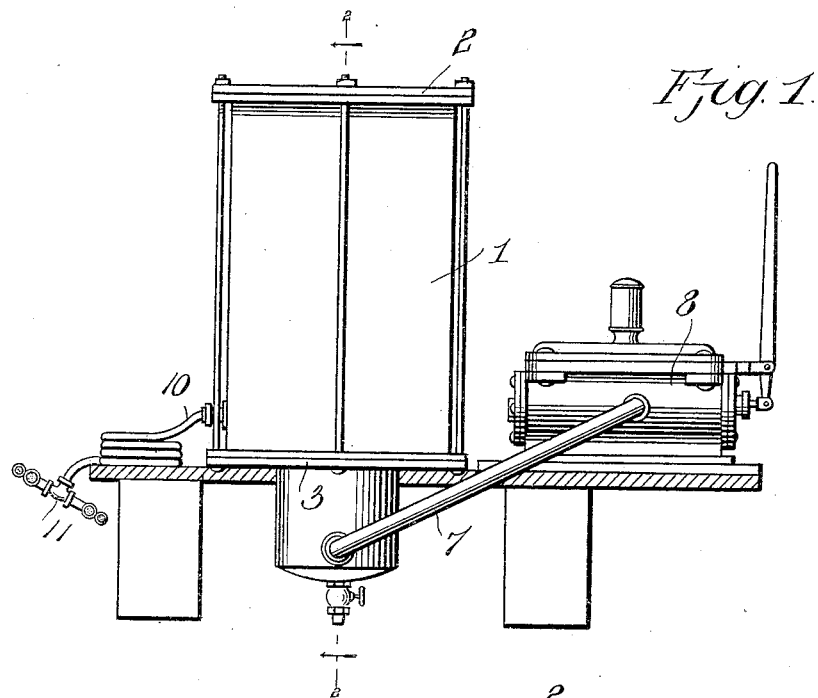
Figure 2:
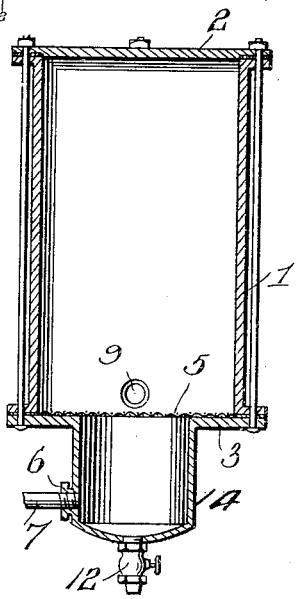

In the drawing:—Figure 1 is a side elevation of the device embodying the invention. Fig. 2 is a vertical sectional view taken on the plane indicated by the line 2—2 in Fig. 1.

Corresponding parts in the several figures are denoted by like characters of reference.

An air chamber has been shown which consists of a cylinder 1 provided with upper and lower removable heads 2 and 3 one of which, preferably the head 3 at the lower end of the chamber, is formed with a cup shaped depression 4 of suitable dimensions. A strainer 5, consisting of a foraminous diaphragm is interposed between the cylinder 1 and the head 3. The cup-shaped recess 4 has an inlet 6 which is connected by a pipe or duct 7 with the pump 8 which is utilized for forcing liquid from a tank or receptacle, not shown, to the air chamber; and the latter is provided with an outlet 9 formed at the lower end of the cylinder 1 above and adjacent to the screen or strainer 5; said outlet being provided with a flexible discharge pipe 10 having a spraying nozzle 11; it being understood, however, that a non-flexible discharge pipe may be used, if preferred, and that a plurality of nozzles of any desired construction may be used as is frequently the case when the invention is applied to spraying apparatus of large capacity. The lower extremity of the cup shaped recess 4 is provided with a valved discharge nozzle 12.

In the operation of this device the spraying liquid is forced by the pump 8 into the cup shaped recess, which constitutes a settling chamber of the air chamber; the liquid being forced upward into the cylindrical portion of the air chamber and through the screen or strainer 5, which intercepts all the coarse particles suspended in the liquid; the latter, free from the obstructing particles, will rise in the cylinder constituting the air chamber and will be discharged in a constant stream from the latter, through the outlet 9, by the air cushion formed in the upper part of the chamber. The sediment may be removed from the cup or receptacle which constitutes the settling chamber, whenever desired, through the valved outlet 12.

This invention, while extremely simple and readily applied to an existing apparatus, forms a safe guard against frequent obstructions of the nozzles, and saves the time required for the purpose of keeping the nozzles clean and unobstructed.

Having thus described the invention, what is claimed as new, is:—

In a device of the class described, the combination with a cylinder provided with upper and lower removable heads, a settling chamber carried by the lower head and provided at the bottom thereof with a valve and in the side thereof with an inlet passage, a strainer carried by the lower head and extending across the settling chamber, a discharge pipe at the extreme lower end of the cylinder and disposed directly above the strainer, a liquid pump, a pipe connecting the pump with a settling chamber adjacent to the bottom thereof so that when liquid is forced under pressure into the cylinder, pressure will be established so that liquid can be discharged from said discharge pipe.

In testimony whereof I affix my signature in presence of two witnesses.

ADELBERT M. PHILLIPS.

Witnesses:
L. M. LANSBURY,
A. C. CATER.